United States Patent Office 3,321,417
Patented May 23, 1967

3,321,417
METHOD OF PREPARING A FOAMED LACTONE POLYMER
Nathan L. Zutty and Frank J. Welch, Charleston, W. Va., assignors to Union Carbide Corporation, a corporation of New York
No Drawing. Continuation of application Ser. No. 156,994, Dec. 4, 1961, now Patent No. 3,224,982, dated Dec. 21, 1965. This application June 22, 1965, Ser. No. 466,077
7 Claims. (Cl. 260—2.5)

This application is a continuation, of Serial No. 156,994, filed Dec. 4, 1961, now Patent No. 3,224,982, entitled, "Method of Preparing a Foamed Lactone Polymer."

The invention relates to foamed polymers of certain vinyl copolymers. More particularly, it is concerned with a process for producing foamed polymeric lactone copolymers and the products produced thereby.

The production of polymeric foams is well known. Generally, these foams are produced by releasing added, dissolved, or entrapped gas from a polymer melt so as to form small bubbles and thus produce a foamed structure. Presently, polystyrene is foamed by compounding the resin with a low boiling hydrocarbon such as pentane to form a mixture which produces a foam when heated above the boiling point of the hydrocarbon and the softening point of the polymer. Vinyl chloride resins are foamed by forcing a gas such as carbon dioxide, ethane, or methyl chloride under pressure into a melt of the polymer and then reducing the pressure of the melt whereby the gas expands and foams the polymer. In essentially all of the known methods, however, the addition of an external foaming agent is a necessary step.

It has now been found that certain vinyl polymers can be foamed without the addition of an external foaming agent. This foaming is accomplished by utilizing a chemical reaction novel to certain polymeric materials.

The vinyl polymers which can be foamed by the process of this invention are those uniform polymers containing units of the formula:

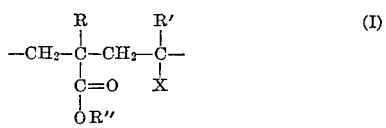

wherein R is an alkyl radical containing from 1 to 4 carbon atoms, a phenyl radical, or a —CH$_2$COOR″; R′ is a hydrogen atom, a methyl radical, or a halogen atom such as chlorine, bromine, fluorine, or iodine; R″ is an alkyl radical containing from 1 to 4 carbon atoms or a tetrahydrofurfuryl radical; and X is a halogen atom as defined above.

The vinyl copolymers that are suitable for use in this invention contain the unit (I) in the polymer chain at concentrations of at least 10 mole percent. The preferred copolymers that the uniform copolymers which consist entirely of such repeating units, that is to say, a uniform copolymer containing the repeating units throughout the polymer chain. For example, a copolymer of vinyl chloride and methyl methacrylate made up of repeating vinyl chloride (VCl) and methyl methacrylate (MMA) units represented as follows:

—VCl—MMA—VCl—MMA—VCl—MMA—
          VCl—MMA—VCl—MMA— (II)

is a completely uniform copolymer containing five units represented by the Formula I, each —VCl—MMA— unit corresponding to a unit of Formula I. This uniform copolymer is made by reacting 50 mole percent each of vinyl chloride and methyl methacrylate. A nonuniform copolymer is one which does not have alternating VCl and MMA units, as represented by the formula:

—MMA—MMA—MMA—VCl—VCl—VCl—
          VCl—VCl—MMA—MMA— (III)

It can be seen that although the uniform (II) and nonuniform (III) copolymers both contain five methyl methacrylate units and five of the units represented by Formula I whereas the nonuniform copolymer has only two such units. Since those copolymers having the greatest number of units represented by the Formula I produce the most desirable foams, it is important that the uniformity of the copolymer be at a maximum.

In the process of the instant invention, the copolymers to be foamed are heated under pressure for a period of time sufficient to release an R″X compound and at the same time form a lactone ring in the polymer chain. The reaction can be represented in its simplest form by the equation

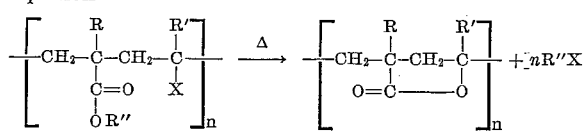

From this equation it becomes obvious why it is desirable to have a uniform a copolymer as possible. The more uniform the copolymer, the more R″X compound formed, resulting in a better foaming action and a large number of lactone rings in the polymer chain.

The uniformity of the copolymers can be controlled and uniform copolymers can be prepared by continuously feeding the faster copolymerizing monomer to the polymerization reaction throughout the duration of the polymerization at such a rate as to keep the ratio of polymerizing comonomers in the reactor as constant as possible. This will lead to polymer chains having the highest degree of uniformity and therefore produce foams with the greatest of ease and the greatest degree of lactonization. Copolymers having a high degree of uniformity can also be produced by carrying out the polymerization reaction to a low conversion so that the comonomer ratio in the reactor is not appreciably altered. The copolymers are readily produced by emulsion, suspension, or bulk processes known in the art. However, as indicated above, the degree of uniformity is increased by following the stated suggestions.

Among the copolymers that can be used are the vinyl chloride/methyl methacrylate copolymer, vinyl chloride/ ethyl methacrylate copolymer, vinyl chloride/butyl methylacrylate copolymer, vinyl bromide/methyl methacrylate copolymer, vinyl fluoride/methyl methacrylate copolymer, vinyl iodide/methyl methacrylate copolymer, vinylidene chloride/methyl methacrylate coploymer, vinylidene chloride/butyl methacrylate copolymer, vinyl chloride/dimethyl itaconate copolymer, vinyl chloride/ tetrahydrofurfuryl methacrylate/methyl methacrylate terpolymer, and the like.

The suitable copolymers are those containing in the polymeric chain from about 5 to 95 mole percent of polymerized units of the formula

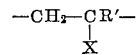

obtained from the polymerization of a vinyl or vinylidene halide with from about 95 to 5 mole percent of polymerized ester units of the formula

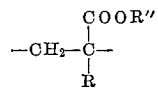

from an ester; preferably the copolymers are those containing from about 20 to 80 mole percent polymerized vinyl vinylidene halide units and from 80 to 20 mole percent polymerized ester units; with the most preferred copolymers being those containing from about 40 to 60 mole percent polymerized vinyl or vinylidene halide units and from 60 to 40 mole percent polymerized ester units.

Among the vinyl halide and vinylidene halide that can be used one can mention vinyl chloride, vinyl bromide, vinyl fluoride, vinyl iodide, vinylidene chloride, vinylidene bromide, vinylidene fluoride, vinylidene iodide, and the like.

Among the esters which can be used to produce the copolymers suitable for foaming by the process of this invention one can mention methyl methacrylate, ethyl methacrylate, butyl methacrylate, methyl alpha-ethyl acrylate, methyl alpha-propyl acrylate, methyl alpha-butyl acrylate, ethyl alpha-ethyl acrylate, propyl alpha-ethyl acrylate, butyl alpha-ethyl acrylate, tetrahydrofurfuryl methacrylate, dimethyl itaconate, diethyl itaconate, dipropyl itaconate, dibutyl itaconate, and the like.

According to this invention the polymers are foamed by a two-step process. The first step is a pyrolysis step during which period the polymer is heated under pressure at elevated temperatures to liberate the R"X compound while at the same time undergoing lactonization. In the second step foaming is permitted to take place by releasing the pressure while the temperature is maintained above the softening point of the polymer.

The pyrolysis is carried out at a temperature from about 100° C. to 250° C., preferably from about 150° C. to 200° C. at the autogenous pressure in the recator up to about 7,500 p.s.i.g. or more. The pyrolysis is carried out for a period of time sufficient to cause lactonization and will vary depending upon the particular polymer being used, the temperature, and the pressure. Normally the time required is inversely proportional to the temperature used. The pyrolyzed polymer is caused to foam by releasing the pressure while the temperature is maintained at from about 50° C. to 200° C., preferably from about 80° C. to 160° C.

The polymer foam can be produced in readily available equipment, the only requirement being that the vessels used for pyrolysis be capable of maintaining the desired pressure and prevent the leakage of the released R"X compound produced during the pyrolysis. Apparatus as simple as a mold and a heated hydraulic press can be used. With this type of apparatus, the polymer is heated in the mold under pressure and at an elevated temperature until the R"X compound is released and lactonization has occurred. The mold is then cooled to the desired temperature for foaming and the hydraulic pressure is suddenly released whereupon the foamed structure pops out of the mold. This technique is known as the mold expansion technique. In a modification of this technique after the R"X compound has been liberated and lactonization has taken place, the mold is cooled to room temperature and the polymer is permitted to solidify. The solidified polymer will not foam even though R"X compound is entrapped in it since the polymer has been cooled below its softening point. This cooled plaque can then be placed in an oven or other heated apparatus and heated to the desired temperature whereupon the entrapped gases expand and a foam is produced. The cooled plaque can, if desired, be placed in a shaped mold and heated whereupon it foams to take on the shape of the mold. This latter heating step can also be performed by steam or radio frequency heating rather than oven heating.

An alternative procedure for producing the foamed polymer is to extrude it directly from the unpyrolyzed polymers. For this purpose a multi-stage, preferably a two-stage, extruder is used. In the first stage the polymer is heated at a temperature high enough for liberation of the R"X compound and lactonization to take place while the second stage of the extruder is maintained at the temperature required for foam production. As the polymer passes through the first heating stage, it is pyrolyzed to the desired lactone structure with the liberated R"X compound remaining entrapped in the molten polymer. The molten polymer is then cooled in the second stage of the extrude to the desired foaming temperature and passes out through an orifice where the pressure of the liberated R"X is released producing the desired foamed shape. This latter technique is exceptionally desirable in the production of a foamed insulation of an electrical conductor.

The foamed polymers produced by this invention can be used in many applications to which foams are applied; for example, they can be used as insulating materials, as cushioning materials, as interlayers in the production of laminted wall panels, and so forth. The lactone polymers of this invention find special utility as molding compounds for the production of sound records.

The foamed polymers of this invention have densities of from about 1 pound per cubic foot to about 30 pounds per cubic foot. It was found that the formation of the lactone structure in the polymer backbone greatly increased the softening point of the foamed polymer over that of the unpyrolyzed and nonfoamed polymer with essentially no change in degree of polymerization. The apparent melting points of the pyrolyzed resins are similar to those of the unpyrolyzed resins. It was also found that the foams of those polymers originally high in vinyl chloride content behaved quite similarly to vinyl chloride, being nonflammable and soluble in common poly(vinylchloride) solvents such as cyclohexanone and tetrahydrofuran. The foams of polymers originally high in methyl methacrylate content were after pyrolysis still soluble in ketones or aromatics and burned rapidly properties common to poly(methyl methacrylate). A pyrolyzed copolymer containing very few halogen or unreacted ester groups was unaffected by immersion at room temperature in kerosene or heptane or after a four-hour immersion at 100° C. in these liquids. Such foams are obtained by the pyrolysis of a 50:50 mole percent copolymer of vinyl chloride and methyl methacrylate.

It was found that the pyrolysis of the uniform copolymers by the process of this invention was smooth, rapid, and almost statistically quantitative—that is to say that during pyrolysis the lactonization reaction was essentially complete, with the liberation of 1 mole of R"X compound for about 85 percent of the units represented by Formula I. In those instances where some nonuniformity exists in the polymer chain, the theoretical amount of R"X compound evolved will be less than the statistically quantitative value. Gas analysis of the liberated gas shows that the gas consisted almost entirely of R"X compound when a uniform polymer as defined in this invention was pyrolyzed. When a blend of polymers, for example, a blend of poly(vinyl chloride) and poly(methyl methacrylate) was pyrolyzed, gas analysis on the liberated gases showed that 5.5 mole percent was methyl chloride, 54.1 mole percent was hydrogen chloride, 35.7 mole percent was methyl methacrylate, and 5.4 mole percent was benzene. This indicates that a polymer blend, although yielding a small amount of methyl chloride, or R"X compound, mainly decomposes to give the expected pyrolysis products of homopolymer decomposition: benzene and hydrogen chloride from poly(vinyl chloride) and methyl methacrylate from poly(methyl methacrylate). The nonuniform copolymer, prepared by polymerizing a mixture of methyl methacrylate and vinyl chloride to complete conversion by conventional procedures, behaved upon pyrolysis much like the blend of the two homopolymers and not at all like the uniform copolymers.

The pyrolysis of poly(methyl alpha-chloroacrylate) by the process of this invention resulted in products other than those which would be obtained by the lactonization reaction and it was found that the liberated gas contained hydrogen chloride, benzene, methanol, and carbon dioxide in addition to the methyl chloride. It was also observed that the pyrolysis of this homopolymer proceeded at a much slower rate than that of the uniform methyl methacrylate/vinyl chloride copolymers. The pyrolysis of the uniform polymers is an intramolecular reaction and cyclization to the lactone in which there is no change in the degree of polymerization of the product, whereas the pyrolysis of the homopolymer or of the blends results in molecular weight degradation and crosslinking as evidenced by the nature of the gaseous by-products recovered and the insolubility of the resulting polymeric products.

When the vinyl or vinylidene halide employed was the bromide rather than the chloride, the pyrolysis reaction was much more rapid when the same ester comonomer was used in producing the polymer. It also was observed that the vinylidene halides are more reactive than the vinyl halides.

The R" group on the ester does not appear to have any effect on the rate or efficiency or lactonization during pyrolysis. However, it was found that the R group should preferably be an electron repelling group such as defined above since electron-withdrawing groups such as halogen atoms causes undesirable side reactions. The uniform copolymers can be blended with fillers or with other polymers and the blends can then be treated by the process of this invention to produce foamed polymers; they can also be incorporated with plasticizers and pyrolyzed to produce flexible foams.

The following examples further serve to illustrate this invention but are not to be considered as limiting it in any manner whatsoever.

*Example 1*

A uniform copolymer (20 grams) containing 29 percent by weight of polymerized methyl methacrylate and 71 weight percent polymerized vinyl chloride was placed in a 2-inch mold in a hydraulic press and heated to 190° C. over a ten-minute period. The pressure was initially 2,000 p.s.i.g. but increased to about 3,000 p.s.i.g. at the end of the heating period. The mold was cooled to room temperature and the plaque was removed. This pyrolyzed plaque had a density of about 60 pounds per cubic foot and it appeared very similar to a regular vinyl plaque but was slightly more flexible. The polymer was a lactone polymer containing units of the formula

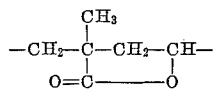

The plaque was placed in a 100° C. oven for ten minutes during which time it foamed to produce a uniform cellular foam which had a densitp of 3 pounds per cubic foot.

*Example 2*

A 20 gram sample of 29.8/70.2 weight percent vinyl chloride/methyl methacrylate copolymer was placed in a 2-inch diameter mold at 80° C. and brought to 4,000 p.s.i.g. pressure by means of a hydraulic press. The mold was steam heated and forty minutes later the temperature was 174° C. and the pressure had increased to 6,000 p.s.i.g. The steam was turned off and in twenty-five minutes the temperature decreased to 120° C. and the pressure to 5,250 p.s.i.g. The hydraulic pressure was then released suddenly whereupon the mold popped apart by the foaming of the lactone polymer. The foam had a closed cell structure and a density of 1.58 pounds per cubic foot.

*Example 3*

In a manner similar to that described in Example 1 a uniform copolymer containing 71 weight percent polymerized vinyl chloride and 29 weight percent polymerized methyl methacrylate was lactonized and foamed. The foam was of closed cell structure and had a density of 1.89 pounds per cubic foot.

*Example 4*

A ram-extruder was charged with about 50 grams of a 21/79 weight percent uniform vinyl chloride-methyl methacrylate copolymer. The chamber which contained the copolymer was closed off and heated to 190° C. during which time the ram was pushed against the sample at a pressure of about 1,000 p.s.i.g. When this temperature was reached, after approximately ten minutes, the heat was turned off and the temperature was permitted to decrease to 150° C. At this point the valve at the end of the extruder was opened, releasing the lactone polymer in the form of a foamed rod having a density of 2.22 pounds per cubic foot.

*Example 5*

A blend containing equal weights of (A) a poly-(vinyl chloride) homopolymer having a reduced viscosity of about 1.5 and (B) a 70.6/29.4 weight percent uniform vinyl chloride/methyl methacrylate was prepared by mixing the two together in a Waring Blendor. This blend was lactonized and foamed in a manner similar to that described in Example 2, using a pyrolysis temperature of 184° C. and a pressure of 6,750 p.s.i.g. and foaming at 115° C. after the pressure had decreased to 6,000 p.s.i.g. The foam had a density of 7.8 pounds per cubic foot.

*Example 6*

A blend was prepared from equal weights of (A) a 92/8 weight percent vinyl chloride/ethylene copolymer and (B) a 70.6/29.4 weight percent vinyl chloride/methyl methacrylate copolymer in the same manner as described in Example 5. The blend was lactonized and foamed in a manner similar to that described in Example 5 with the pyrolysis temperature being 188° C. and the pressure 7,000 p.s.i.g. The pyrolyzed copolymer was foamed at 120° C. after the pressure had dropped to 6,500 p.s.i.g. The foam had a density of 4.9 pounds per cubic foot.

*Example 7*

A 66.5/33.5 weight percent uniform vinyl chloride/ethyl methacrylate copolymer was lactonized and foamed as described in Example 1. The pyrolysis and lactonization reaction was carried out for ten minutes at 195° C. and 5,000 p.s.i.g.; and the foaming reaction was conducted at 100° C. The foam produced had a density of 1.9 pounds per cubic foot.

*Example 8*

A 66.8/33.2 weight percent uniform vinylidene chloride/methyl methacrylate copolymer was reacted in a manner similar to that described in Example 1. The lactonization was carried out at 195° C. and 5,000 p.s.i.g. for two minutes; and the resulting mixture was foamed at 100° C. The lactone polymer contained units of the formula

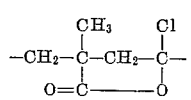

The foam had a density of 2.6 pounds per cubic foot.

*Example 9*

A sample of an 80/20 weight percent uniform vinyl chloride/dimethyl itaconate copolymer having a reduced viscosity of 0.62, as measured from a 0.2 percent solution of the copolymer in cyclohexanone at 30° C., was placed in a 2-inch diameter mold at 50° C. and brought to 4,000 p.s.i.g. by means of a hydraulic press. The temperature was raised to 180° C. with a superheated steam and the pressure in the mold increased to 6,000 p.s.i.g. After cooling the mold to 105° C., the hydraulic pressure was suddenly released whereupon the mold popped apart by the foaming of the lactone polymer. The foam had a density of 6.24 pounds per cubic foot.

It was observed that the process of this reaction progresses in two stages with the uniform copolymers of dimethyl itaconate and vinyl chloride. The first stage takes place at about 110° C. to form a six-membered lactone ring as follows:

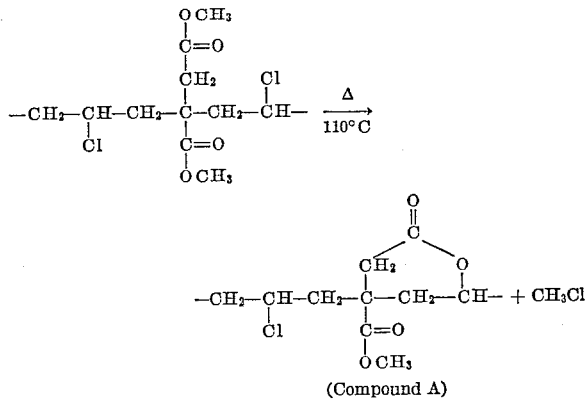

(Compound A)

In the second stage the lactone produced at temperatures above about 110° C. when heated at temperatures above about 150° C. produces a second lactone ring, this one containing five members in the ring, as follows:

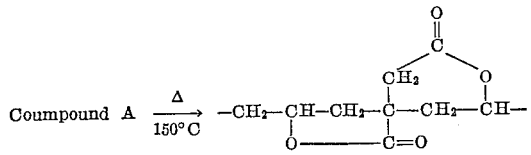

The same reaction occurs with other vinyl halides or vinylidene halides.

*Example 10*

An 18/50/32 weight percent uniform vinyl chloride/methyl methacrylate/tetrahydrofurfuryl methacrylate terpolymer having a reduced viscosity of 1.25 was placed in a 2-inch diameter mold at 60° C. and borught to 4,000 p.s.i.g. pressure by means of a hydraulic press. The press was heated by steam and after one hour the temperature of the mold was 187° C. and the pressure was 7,250 p.s.i.g. The steam was turned off and the mold was cooled to a temperature of 120° C. while the pressure dropped to 6,500 p.s.i.g. The hydraulic pressure was then released suddenly, whereupon the mold popped open by the foaming of the lactone polymer. The foam was of uniform cellular structure, had a white color, and had a density of 4.6 pounds per cubic foot.

*Example 11*

A 63.1/36.9 weight percent uniform vinyl bromide/methyl methacrylate copolymer having a reduced viscosity of 0.12 was placed in a 1¾ inch compression mold at 30° C. The mold was heated over a twenty-five minute period to 170° C. during which period the pressure in the mold increased to 2,150 p.s.i.g. Thereafter the mold was cooled to 100° C.; the press pressure was suddenly released to allow the foaming material to pop the mold apart. The lactone polymer foam had a density of 5.9 pounds per cubic foot.

Attempts were made to foam monuniform copolymers as obtained by conventional emulsion polymerization procedures wherein the initial monomers charge is reacted until the polymerization reaction is completed. To vinyl chloride/methyl methacrylate copolymers were used containing 70 and 30 weight percent vinyl chloride, respectively. Each sample was pyrolyzed at 190° C. and 5,000 p.s.i.g. for ten minutes, the mold was cooled, and the plaque was removed as described in Example 1. The plaques were then placed in a 100° C. oven in an attempt to foam the pyrolyzed resins. Only slight bubbling occurred with no foam being produced from either polymer sample. This is in contrast to the results obtained in the above examples which were carried out under similar conditions and which produced satisfactory foams from the uniform copolymers. In addition, a vinyl chloride/ethyl acrylate copolymer containing 76.7 weight percent of the vinyl chloride monomer was treated in a manner similar to that described in Examples 7 and 8. No evidence of foaming was observed. This substantiates the necessity of having an R substitutent on the ester monomer used in producing the copolymers.

What is claimed is:

1. A process for producing a lactone-containing foam which comprises heating at from 100° C. to 250° C. and at a superatmospheric pressure up to 7,500 p.s.i.g. a uniform copolymer selected from the group consisting of:
   (a) vinyl chloride/methyl methacrylate,
   (b) vinyl chloride/methyl methacrylate in homogeneous admixture with poly(vinyl chloride),
   (c) vinyl chloride/methyl methacrylate in homogeneous admixture with a vinyl chloride/ethylene copolymer,
   (d) vinyl chloride/dimethyl itaconate,
   (e) vinyl chloride/methyl methacrylate/tetrahydrofurfuryl methacrylate, and
   (f) vinyl bromide/methyl methacrylate so as to produce the lactone polymer thereof together with the corresponding methyl halide, and then releasing the pressure at from about 50° C. to 200° C.

2. A process for producing a lactone-containing foam which comprises heating at from 100° C. to 250° C. and at a pressure up to 7,500 p.s.i.g. a uniform vinyl chloride/methyl methacrylate copolymer so as to produce the lactone polymer thereof together with methyl chloride, and then releasing the pressure at from about 50° C. to 200° C. to foam said lactone polymer.

3. A process for producing a lactone-containing foam which comprises heating at from 100° C. to 250° C. and at a pressure up to 7,500 p.s.i.g. a blend of a uniform vinyl chloride/methyl methacrylate copolymer with poly(vinyl chloride) so as to produce the lactone polymer thereof together with methyl chloride, and then releasing the pressure at from about 50° C. to 200° C. to foam said lactone polymer.

4. A process for producing a lactone-containing foam which comprises heating at from 100° C. to 250° C. and at a pressure up to 7,500 p.s.i.g. a blend of a uniform vinyl chloride/methyl methacrylate copolymer with a vinyl chloride/ethylene copolymer so as to produce the lactone polymer thereof together with methyl chloride, and then releasing the pressure at from about 50° C. to 200° C. to foam said lactone polymer.

5. A process for producing a lactone-containing foam which comprises heating at from 100° C. to 250° C. and at a pressure up to 7,500 p.s.i.g. a uniform vinyl chloride/dimethyl itaconate copolymer so as to produce the lactone polymer thereof together with methyl chloride, and then releasing the pressure at from about 50° C. to 200° C. to foam said lactone polymer.

6. A process for producing a lactone-containing foam which comprises heating at from 100° C. to 250° C. and at a pressure up to 7,500 p.s.i.g. a uniform vinyl chloride/methyl methacrylate/tetrahydrofurfuryl methacrylate polymer so as to produce the lactone polymer thereof together with methyl chloride, and then releasing the pressure at from about 50° C. to 200° C. to foam said lactone polymer.

7. A process for producing a lactone-containing foam which comprises heating at from 100° C. to 250° C. and at a pressure up to 7,500 p.s.i.g. a uniform vinyl bromide/methyl methacrylate copolymer so as to produce the lactone polymer thereof together with methyl bromide, and then releasing the pressure at from about 50° C. to 200° C. to foam said lactone polymer.

References Cited by the Examiner
UNITED STATES PATENTS

| | | | |
|---|---|---|---|
| 2,537,881 | 1/1951 | Dickey | 260—88.3 |
| 2,684,341 | 7/1954 | Anspon et al. | 260—2.5 |
| 3,044,970 | 7/1962 | Baumeistir et al. | 260—2.5 |
| 3,049,521 | 8/1962 | Burkholder | 260—86.3 |

MURRAY TILLMAN, *Primary Examiner.*

J. C. BLEUTGE, *Assistant Examiner.*